(12) United States Patent
Andry et al.

(10) Patent No.: US 6,731,361 B2
(45) Date of Patent: May 4, 2004

(54) HIGH RESOLUTION IN-PLANE SWITCHING MODE TFT-LCD

(75) Inventors: Paul S. Andry, Mohegan Lake, NY (US); Praveen Chaudhari, Briarcliff Manor, NY (US); James P. Doyle, Bronx, NY (US); Eileen A. Galligan, Fishkill, NY (US); Richard A. John, Yorktown Heights, NY (US); James A. Lacey, Mahopac, NY (US); Shui-Chih A. Lien, Briarcliff Manor, NY (US); Minhua Lu, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 257 days.

(21) Appl. No.: 09/876,382

(22) Filed: Jun. 7, 2001

(65) Prior Publication Data

US 2002/0186337 A1 Dec. 12, 2002

(51) Int. Cl.[7] .............................................. G02F 1/1333
(52) U.S. Cl. ........................ 349/122; 349/123; 349/128; 349/135; 349/138; 349/140
(58) Field of Search ................................. 349/122, 123, 349/128, 135, 138, 140

(56) References Cited

U.S. PATENT DOCUMENTS

| 5,309,264 | A | 5/1994 | Lien et al. |
|---|---|---|---|
| 5,623,354 | A | 4/1997 | Lien et al. |
| 5,770,826 | A | 6/1998 | Chaudhari et al. |
| 5,907,380 | A | 5/1999 | Lien |
| 6,020,946 | A | 2/2000 | Callegari et al. |
| 6,061,114 | A | 5/2000 | Callegari et al. |
| 6,124,914 | A | 9/2000 | Chaudhari et al. |
| 6,195,146 | B1 | 2/2001 | Chaudhari et al. |
| 6,346,975 | B2 * | 2/2002 | Chaudhari et al. .......... 349/124 |
| 2001/0026331 | A1 * | 10/2001 | Oota et al. .................... 349/43 |
| 2001/0052961 | A1 * | 12/2001 | Towler et al. ............... 349/177 |

* cited by examiner

*Primary Examiner*—Allan R. Wilson
*Assistant Examiner*—Matthew E. Warren
(74) *Attorney, Agent, or Firm*—Robert M. Trepp; Benjamin M. Halpern (57) ABSTRACT

Display panels and methods for fabrication are disclosed for an in-plane switching mode display to reduce or eliminate image sticking. The display panel includes a substrate with a first electrode formed on the substrate. A dielectric layer is formed on the substrate, and the dielectric layer forms an opening down to the first electrode so that the dielectric layer is eliminated over the first electrode. A second electrode is formed on the dielectric layer, and an alignment layer is formed on the first electrode, the second electrode and the dielectric layer.

23 Claims, 13 Drawing Sheets

RELATED ART

HIGH RESOLUTION IN-PLANE SWITCHING MODE TFT-LCD

BACKGROUND OF THE INVENTION

1. Field of the Invention

The present invention relates to liquid crystal displays, and more particularly to an apparatus and method for transferring reducing image sticking in liquid crystal displays.

2. Description of the Related Art

In-plane switching (IPS) mode for liquid crystal displays is one of the most popular modes for desk top monitor applications. This is due to the capability of IPS mode displays which provides for large viewing angles. In addition to the problems, such as, low aperture ratio and slow response time, image sticking is a major problem facing all the display manufacturers. Image sticking is a phenomena in which previously displayed images remain, in part of the display scene.

It well known that the image sticking in IPS mode is worse than twisted nematic (TN) modes which have been widely used in notebook computers. Presently, there is no effective solution to image sticking. In some advanced applications, long term image sticking may last three or more hours. The image sticking problem will be an obstacle in advanced liquid crystal alignment systems, preventing the application of these systems into manufacturing. The image sticking problem for IPS mode displays would also be limited thereby limiting the growth of the display market in this area.

Therefore, a need exists for an apparatus and method for reducing or eliminating images sticking from IPS mode LCDs. A further need exists for improving aperture ratio for IPS mode displays.

SUMMARY OF THE INVENTION

Display panels and methods for fabrication are disclosed for an in-plane switching mode display to reduce or eliminate image sticking. The display panel includes a substrate with a first electrode formed on the substrate. A dielectric layer is formed on the substrate, and the dielectric layer forms an opening down to the first electrode so that the dielectric layer is eliminated over the first electrode. A second electrode is formed on the dielectric layer, and an alignment layer is formed on the first electrode, the second electrode and the dielectric layer.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

The present invention provides liquid crystal displays, in particular, in-plane switching (IPS) mode displays, which provide reduced image sticking. The present invention also provides a display panel with increased aperture ratio of the pixel region. High aperture ratio can be achieved by overlapping common electrodes with data metal. One embodiment of the present invention is related to an IPS-PFA (Polymer Film Array) liquid crystal displays (LCD). In this embodiment, a polymer layer is deposited on signal lines, and common electrodes are formed on the polymer layer and over the signal electrodes (e.g., gate and data electrodes). The pixel electrodes are fabricated in two portions. An upper portion is arranged on the same layer as the common electrode, and a lower portion is arranged on the layers of the signal lines. Advantageously, this structure and other structures described herein reduce or eliminate charge trapping which leads to image sticking. Embodiments and features of the present invention will now be described in further detail with reference to the drawings.

Figure 1:
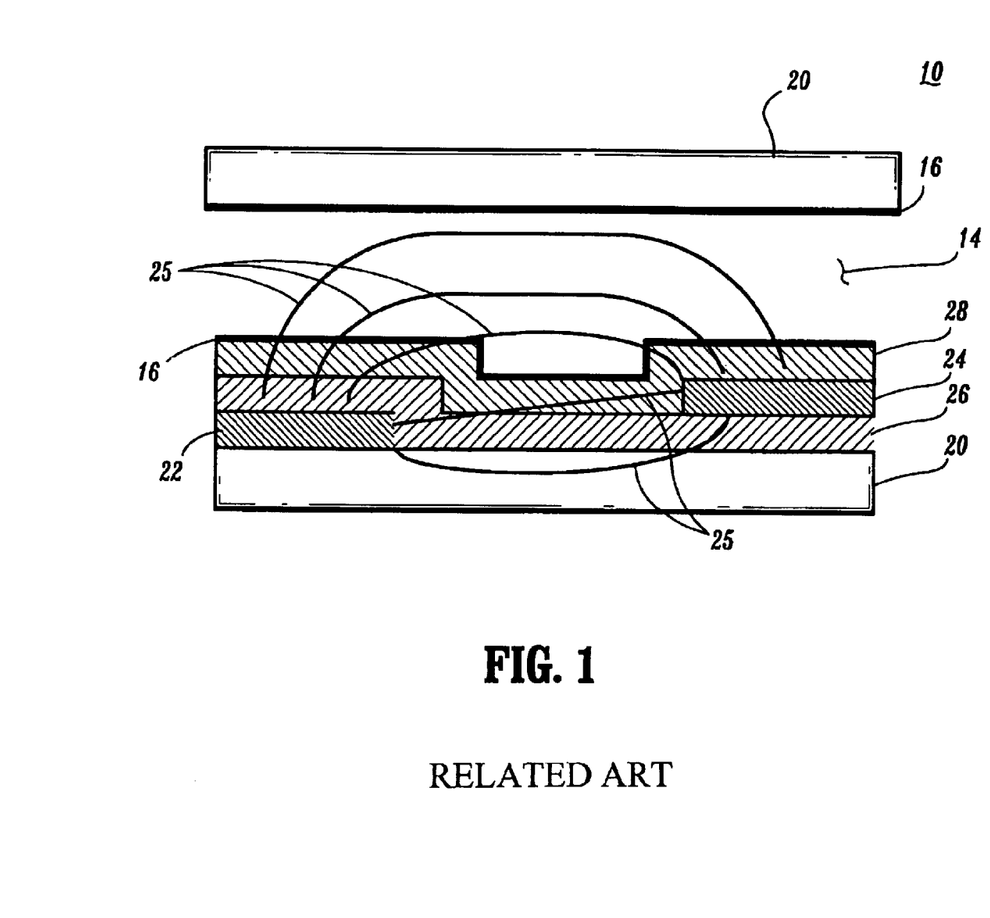
FIG. 1 is a cross-sectional view of an in-plane switching (IPS) mode display showing field lines for aligning liquid crystal material.
Figure 2:
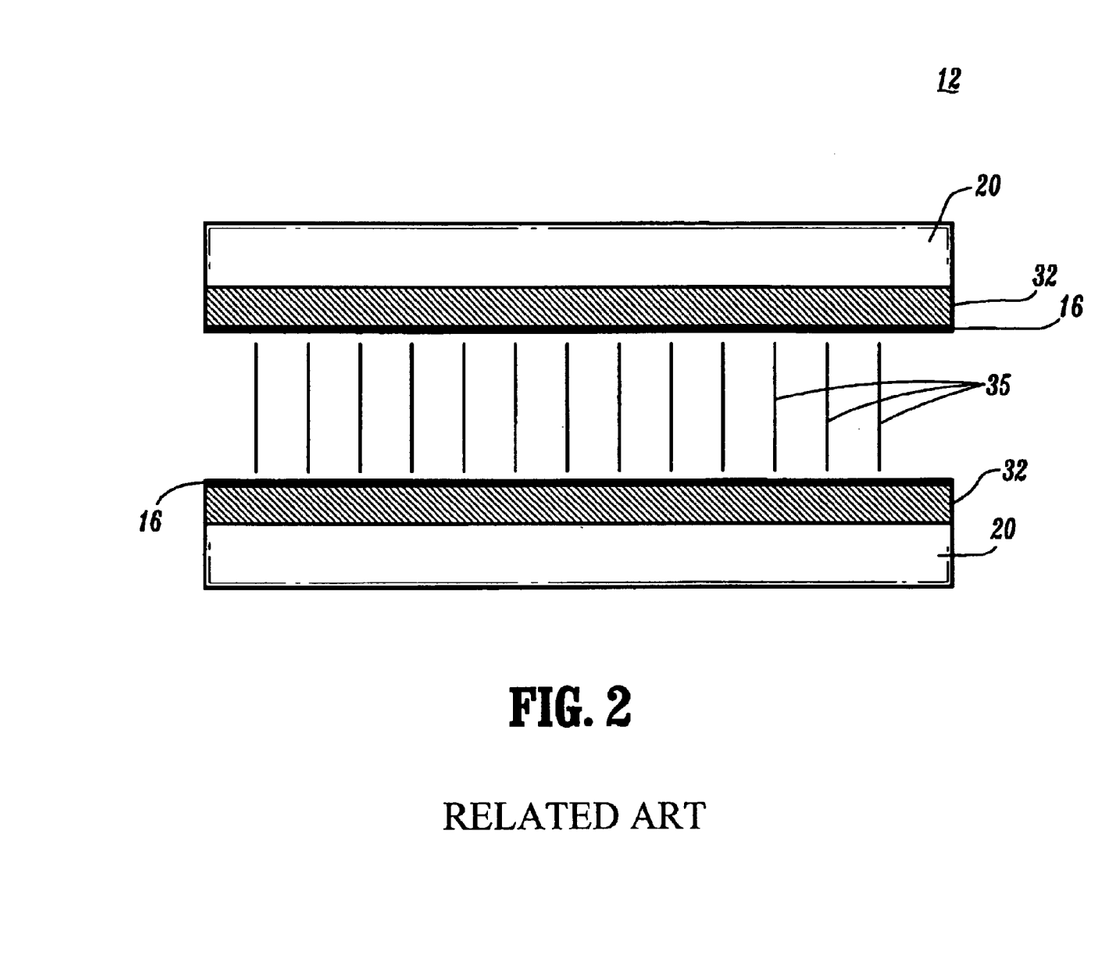
FIG. 2 is a cross-sectional view of a twisted nematic (TN) mode display showing field lines for aligning liquid crystal material.

Referring now in detail to the figures in which like numerals represent the same or similar elements and initially to FIGS. 1 and 2, cross-sectional views of basic components of an IPS mode display 10 are shown in FIG. 1 while basic components of a twisted nematic (TN) mode display 12 are shown in FIG. 2. Displays 10 and 12 have been studied by the inventors to determine how image sticking occurs. Displays 10 and 12 include substrates 20, preferably formed from glass.

Referring to FIG. 1, display 10 includes a first electrode 22, which may include a common electrode, including, for example, aluminum, indium tin oxide (ITO), indium zinc oxide (IZO), etc. A second electrode 24 is formed on a dielectric layer 26 which separates the first electrode layer from the second electrode layer. Second electrode 24 may include a pixel electrode including, for example, MoW, ITO, IZO, etc. Dielectric layer 26 may include, for example, silicon oxide. A dielectric layer 28 covers second electrode 24. Dielectric layer 28 may include, for example silicon nitride.

Liquid crystal 14 is disposed between polyimide 16 formed on layer 28 and polyimide 16 formed over the top substrate 20. Polyimide 16 is employed as an alignment layer for liquid crystal 14 as is known in the art.

Referring to FIG. 2, transparent conductive layers 32 are formed on the substrates 20 of the TN mode display. Liquid crystal 14 and polyimide 16 are also used in the TN mode in FIG. 2.

Referring again to FIGS. 1 and 2, the most significant difference between the two structures 10 and 12 is the electrode structures. An electric field indicated by field lines 25 in IPS mode is distributed through the entire display while field lines 35 in TN mode is confined in between electrodes 32.

Due to the nature of the unconfined electric field in IPS panels, charge trapping can occur at interfaces of dielectric layers. In the illustrative IPS structure 10, the electrodes 22 and 24 are separated by silicon oxide and both electrodes are covered by a silicon nitride passivation layer 28. Since liquid crystal (LC) 14 is not an ideal dielectric, it includes ions and has a finite resistivity. The ions in LC 14 will respond to the DC field and migrate towards the electrodes with opposite sign of their potential. In response, charge is injected from the electrodes to balance the potential.

Figure 3A:
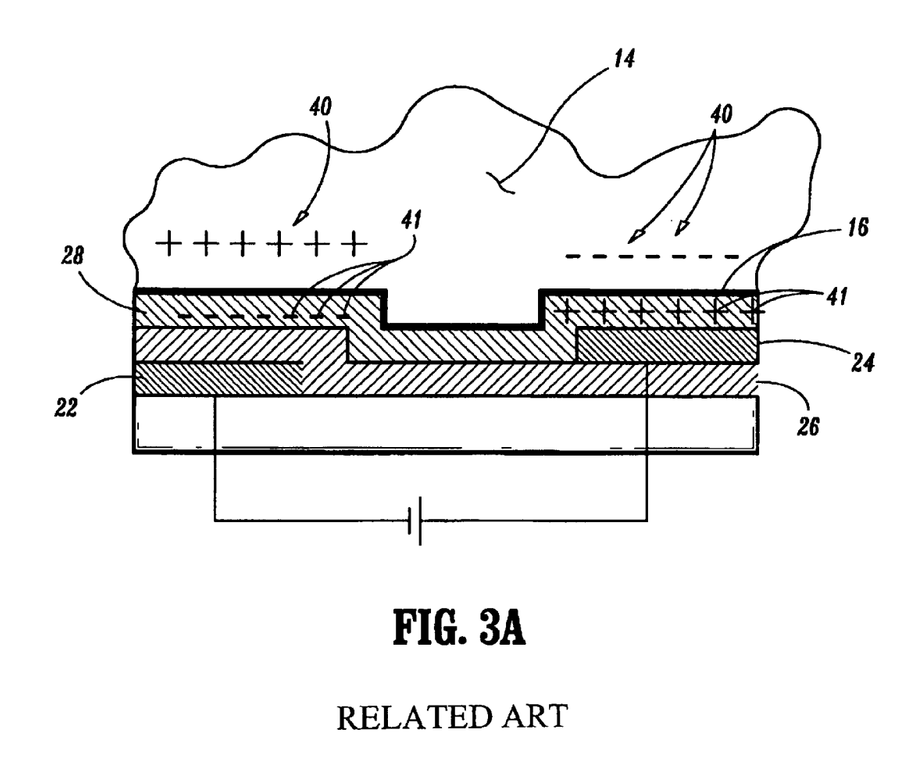
FIGS. 3A and 3B are cross-sectional views showing charge trapping in an IPS mode display.
Figure 3B:
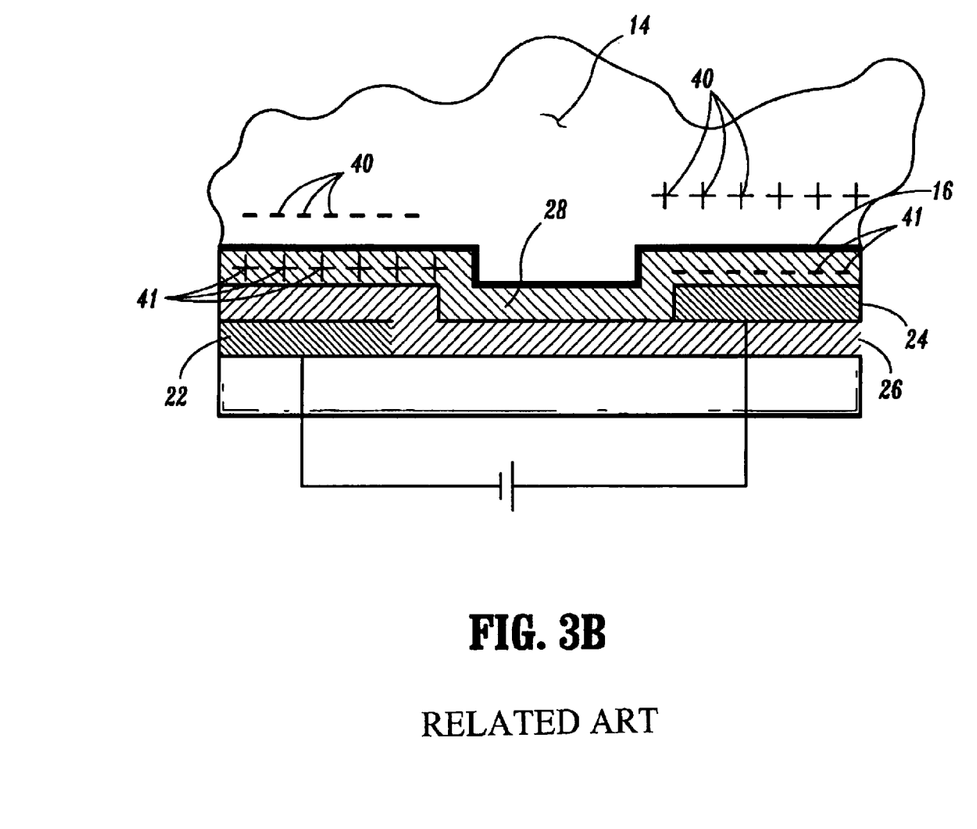

Referring to FIGS. 3A and 3B, ions 40 in LC 14 will respond to electrical fields (see FIG. 1) created and migrate towards electrodes 22 or 24 which include an opposite potential of that of ions 40. In response, charge 41 is injected from electrodes 22 and 24 to balance the potential. Depending on the material, the charges may be trapped at the interfaces between LC 14 and dielectric layer 28 or between dielectric layers 26 and 28 or even between substrate 20 and dielectric layer 26.

This results in a non-zero potential even after the removal of the DC field on electrodes 22 and 24. Such a residual field will change director orientation of the liquid crystal molecules, and cause residual images. These residual images are referred to as image sticking. Such effect is more pronounced in the IPS panels than TN panels, since the IPS mode includes a more complicated field configuration and includes more interfaces for possible charge trapping.

The effects of interface charge trapping have been demonstrated by residual voltage measurement performed by the inventors. After applying a DC voltage onto the display panel for a certain period of time, the voltage is removed and the circuits shorted for 2 seconds. The circuits are then opened and the voltage left between the two electrodes is measured. The residual voltage represents the extent of charge trapping and therefore the extent of image sticking. Residual voltage for different display structures is shown in FIG. 4.

Figure 4:
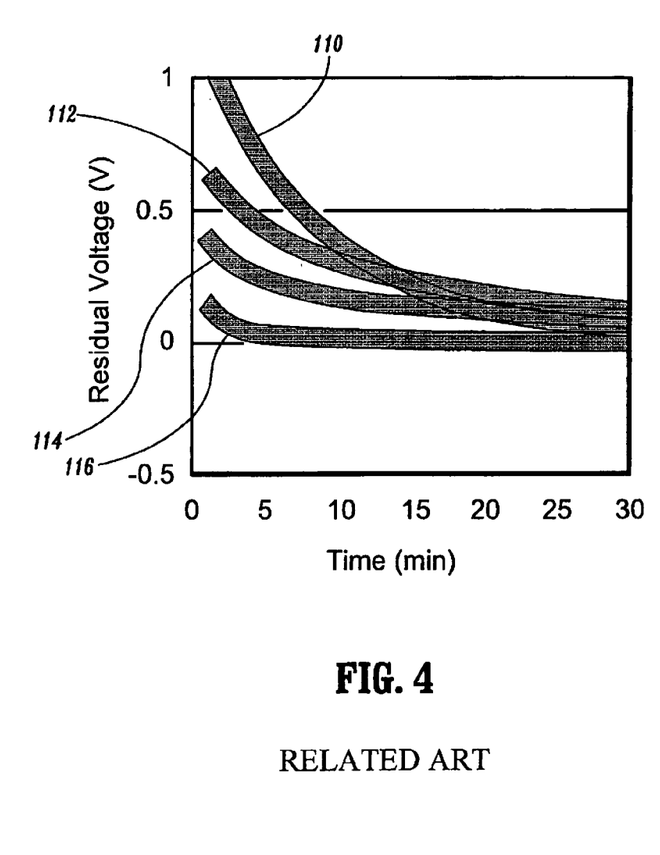
FIG. 4 is a plot of residual voltage after DC bias as a function of time which compares IPS mode display structures with and without passivation layers in accordance with the present invention.

Referring to FIG. 4, a plot of residual voltage versus time between two parallel electrodes with different passivation layers under an alignment layer where 4V DC was applied to the electrodes for 10 minutes. An illustrative structure is shown in FIG. 5.

Figure 5:
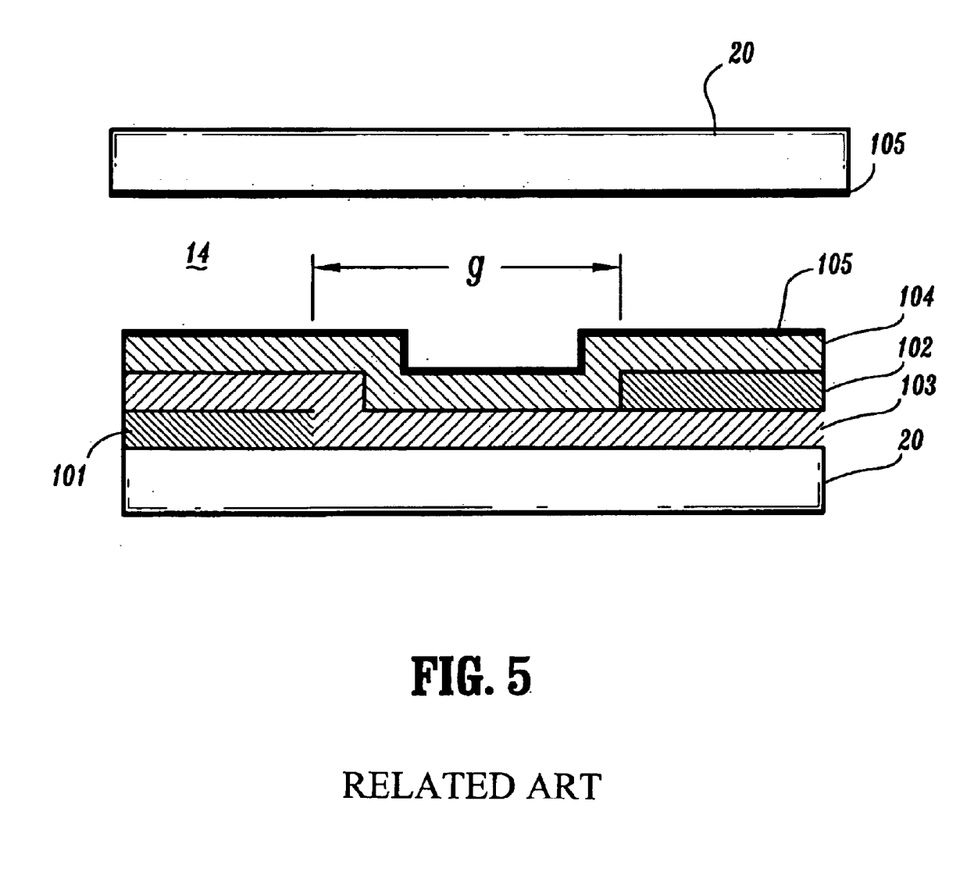
FIG. 5 is a cross-sectional view of an illustrative IPS mode display with dielectric layers or passivation layers in between electrodes.

Referring to FIG. 5, two parallel electrodes 101 and 102 (e.g., common electrode and pixel electrode, respectively) have a first dielectric layer 103 disposed therebetween. A second dielectric layer 104 is optionally applied. Liquid crystal material 14 is in contact with an alignment layer 105. Alignment layer 105 may be formed on layer 104 if present or formed over layer 103 and electrode 102 if layer 104 is not present, as will be described for each curve in FIG. 4. Electrodes 101 and 102 are formed with a lateral gap, g, of about 1.5 mm.

Referring to FIGS. 4 and 5, curve 110 shows a residual voltage over time for a diamond-like-carbon alignment layer 105 without the use of layer 104. Curve 112 shows a residual voltage over time for a diamond-like-carbon alignment layer 105 formed on layer 104. Layer 104, in this case, includes silicon nitride having a thickness of about 2000 angstroms.

Curve 114 shows a residual voltage over time for a diamond-like-carbon alignment layer 105 formed on layer 104. Layer 104, in this case, includes silicon oxide having a thickness of about 2000 angstroms. Curve 116 shows a residual voltage over time for a diamond-like-carbon alignment layer 105 formed on layer 104. Layer 104, in this case, includes a silicon nitride layer having a thickness of about 2000 angstroms and a silicon oxide layer having a thickness of about 2000 angstroms.

The residual voltage is lower without passivation layers than with passivation layers. The residual voltage of the sample with double passivation layer (curve 116) is almost equal to the sum of the residual voltage of the two single layer passivation structures (curves 112 and 114).

In one embodiment of the present invention, to eliminate charge trapping at the interface of liquid crystal and a passivation layer, the top passivation layer is removed in IPS display panels. There are a plurality of ways to remove the passivation layer in accordance with the present invention.

Figure 6:
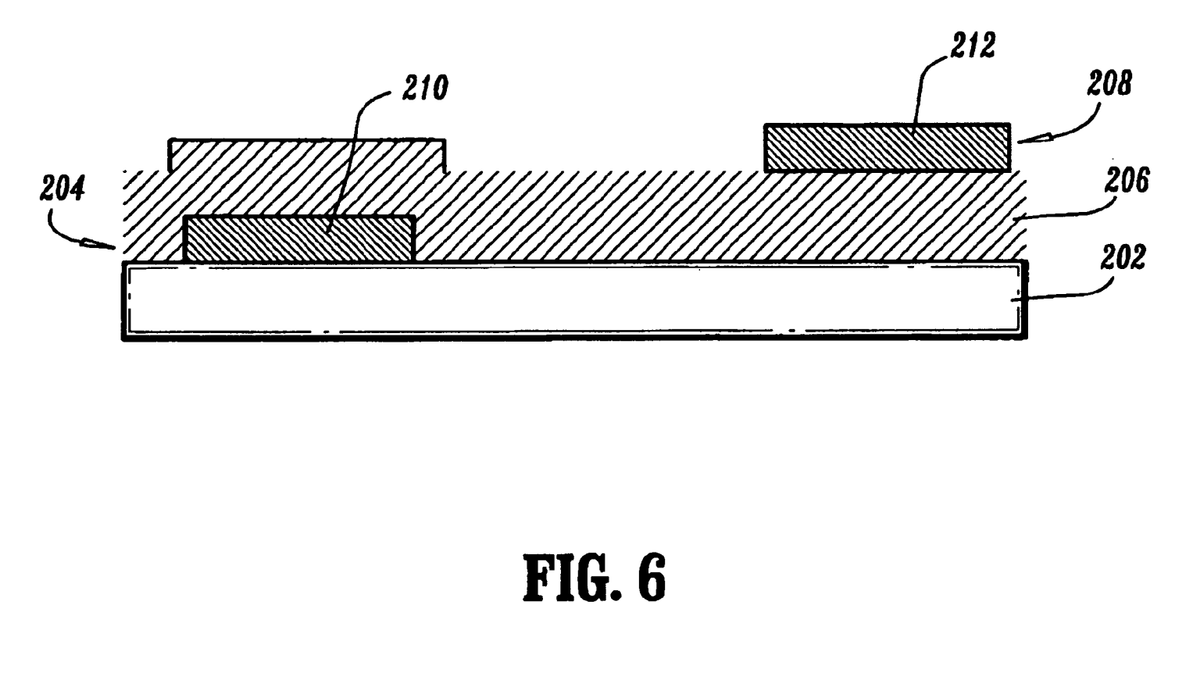
FIG. 6 is a cross-sectional view of an in-plane switching (IPS) mode display showing common and pixel electrodes formed in accordance with the present invention.

Referring to FIG. 6, a structure for an IPS mode display panel is shown in accordance with one embodiment of the present invention. A substrate 202, which may include glass or other suitable materials, includes a gate conductor (e.g., gate metal) 204 patterned thereon. A gate dielectric layer 206 is formed over conductor 204 and substrate 202. Now, a thin film transistor (TFT) array (not shown) is formed as is known in the art. A data conductor layer (e.g., data metal) 208 is patterned on gate dielectric layer 206. In this way a first electrode 210 (common electrode) and a second electrode 212 (pixel electrode) are formed.

It is to be understood that electrodes 210 and 212 may be reversed, that is electrode 210 may be formed as a pixel electrode and electrode 212 may be formed as a common electrode.

Figure 7:
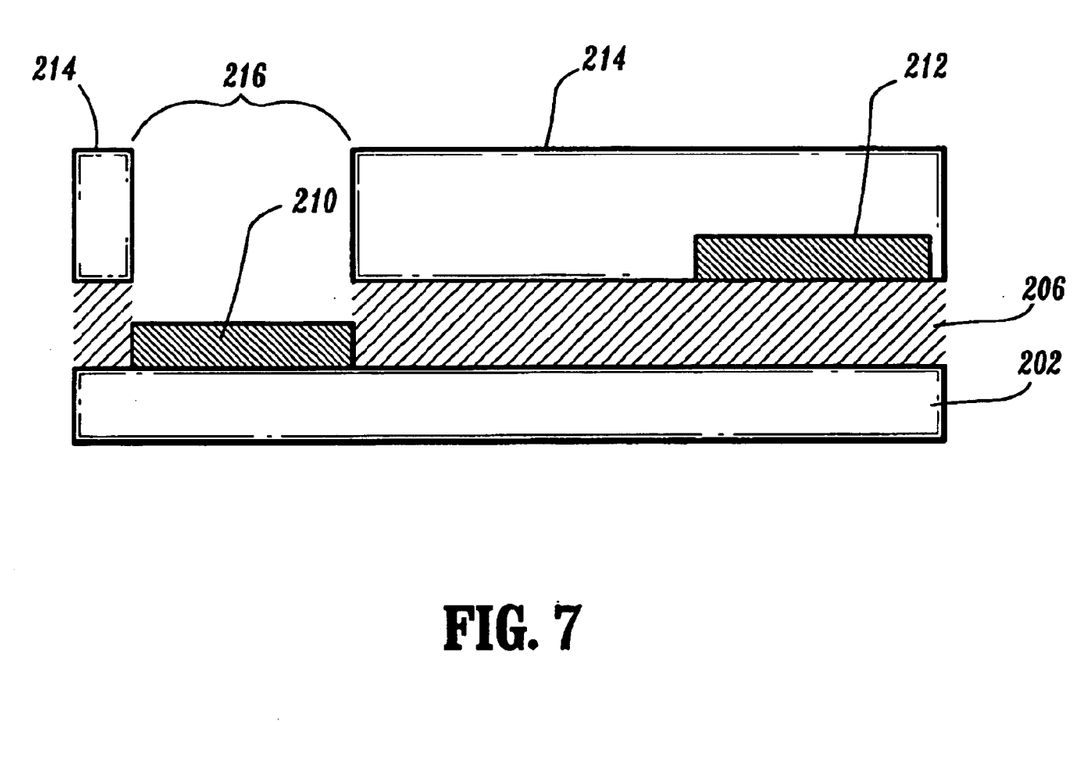
FIG. 7 is a cross-sectional view of the IPS mode display of FIG. 6 showing an electrode formed below a dielectric layer exposed by etching in accordance with the present invention.

Referring to FIG. 7, dielectric layer 206 is removed over electrode 210 by a mask and etch process. A resist layer 214 may be formed over passivation layer 206 and electrode 212. Resist 214 is patterned and dielectric layer 206 is etched by, for example, a reactive ion etch (RIE) to open up dielectric layer 206 over electrode 210. Layer 206 is removed in a region 216 to expose electrode 210. Resist layer 214 is then stripped.

Figure 8:
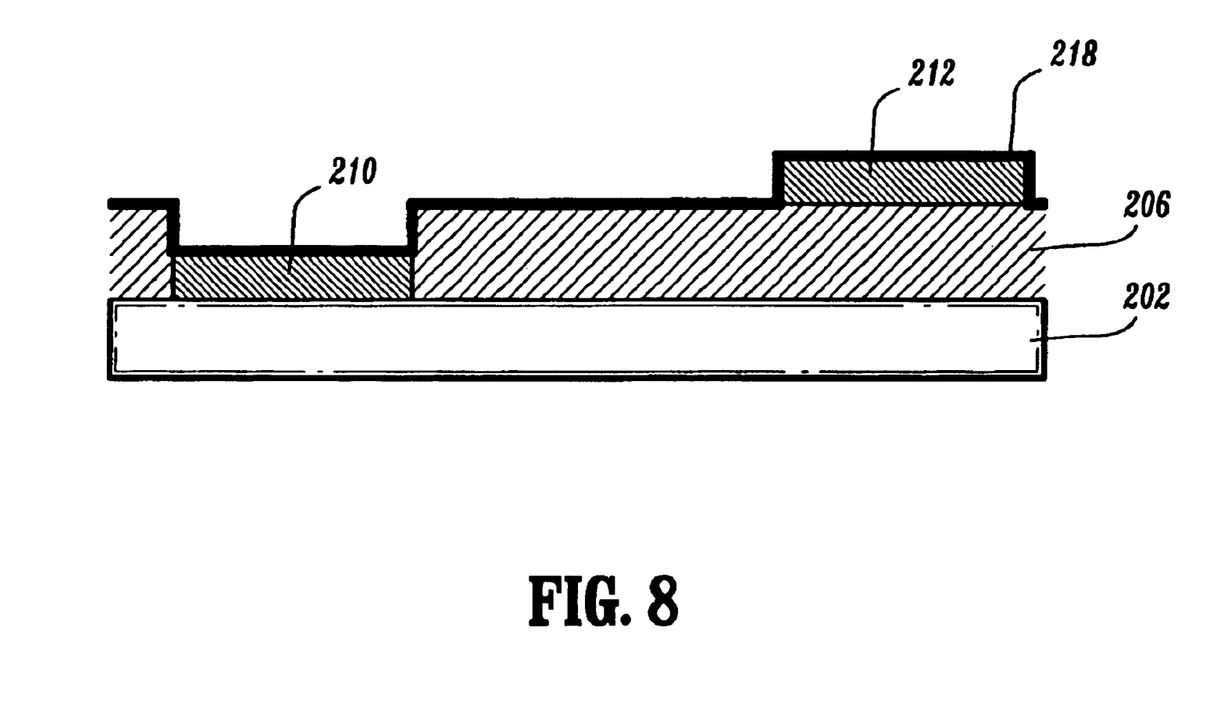
FIG. 8 is a cross-sectional view of the IPS mode display of FIG. 7 showing a common electrode with the dielectric layer removed and showing the common electrode and the data metal or pixel electrodes in contact with an alignment layer in accordance with the present invention.

Referring to FIG. 8, an alignment layer 218 is formed on dielectric layer 206 and electrodes 210 and 212. Alignment layer 218 may include, for example, diamond-like-carbon (DLC) with an ion bean treatment, rubbed polymers or any other suitable alignment layer known in the art. Remaining fabrication steps are continued from this point as is known in the art to form an IPS mode display device. The structure and method described in FIGS. 6–8 provides an IPS panel structure with reduced image sticking.

Electrode 210 and electrode 212 may include different conductive materials. For example, electrode 210 may include aluminum, ITO, IZO, etc., while electrode 212 may include molybdenum, ITO, IZO, or tungsten or a combination thereof. Different metals usually have different work functions. The work function difference may result in a voltage shift between electrodes 210 and 212 and generate a DC field, which may cause image sticking. To compensate for work function differences, the same material may be employed for the common electrode conductive material and the pixel electrode conductive material. However, other embodiments may include the features described below.

Figure 9:
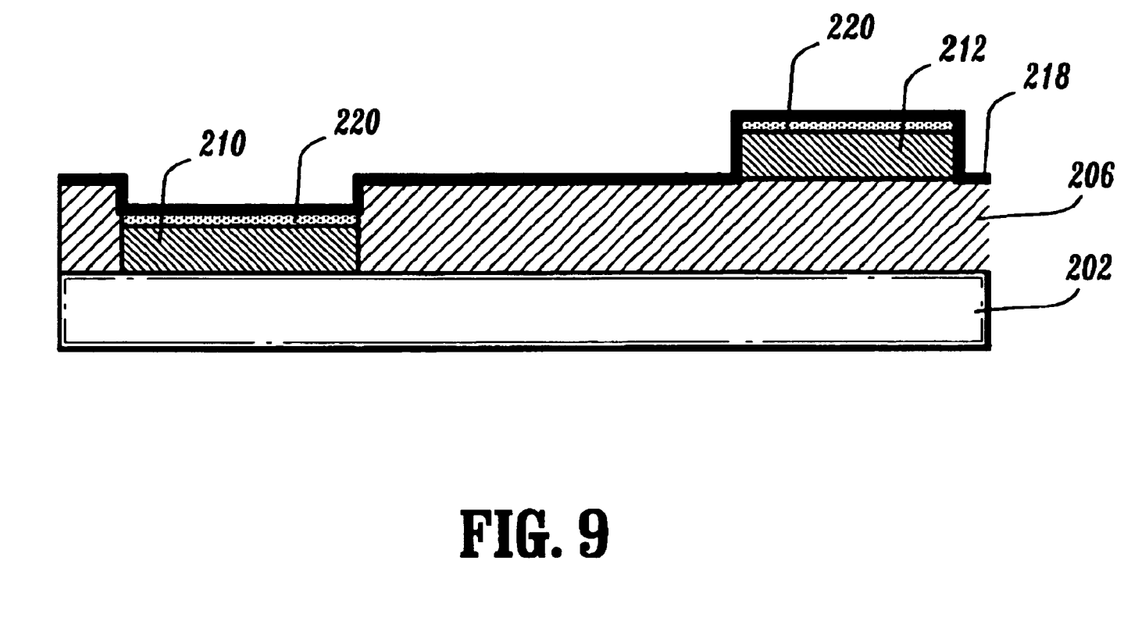
FIG. 9 is a cross-sectional view of the IPS mode display of FIG. 8 showing the common electrode and the pixel electrodes with a conductor layer formed thereon in accordance with the present invention.

Referring to FIG. 9, in accordance with the present invention, to compensate for work function differences between electrodes 210 and 212, a conducting layer 220 may be formed on electrodes 210 and 212. Conducting layer 220 is preferably transparent and may include materials, such as indium tin oxide (ITO) or indium zinc oxide (IZO), although opaque metals may be employed. Conducting layer 220 may be coated on top of electrodes 210 and 212 and patterned to cover electrodes 210 and 212. In this way, work function differences are accounted for, since a same materials is employed on top surfaces of electrodes 210 and 212, even though different materials are employed for electrode 210 and electrode 212. An alignment layer 218 may then be formed on conducting layer 220 as described above.

Figure 10:
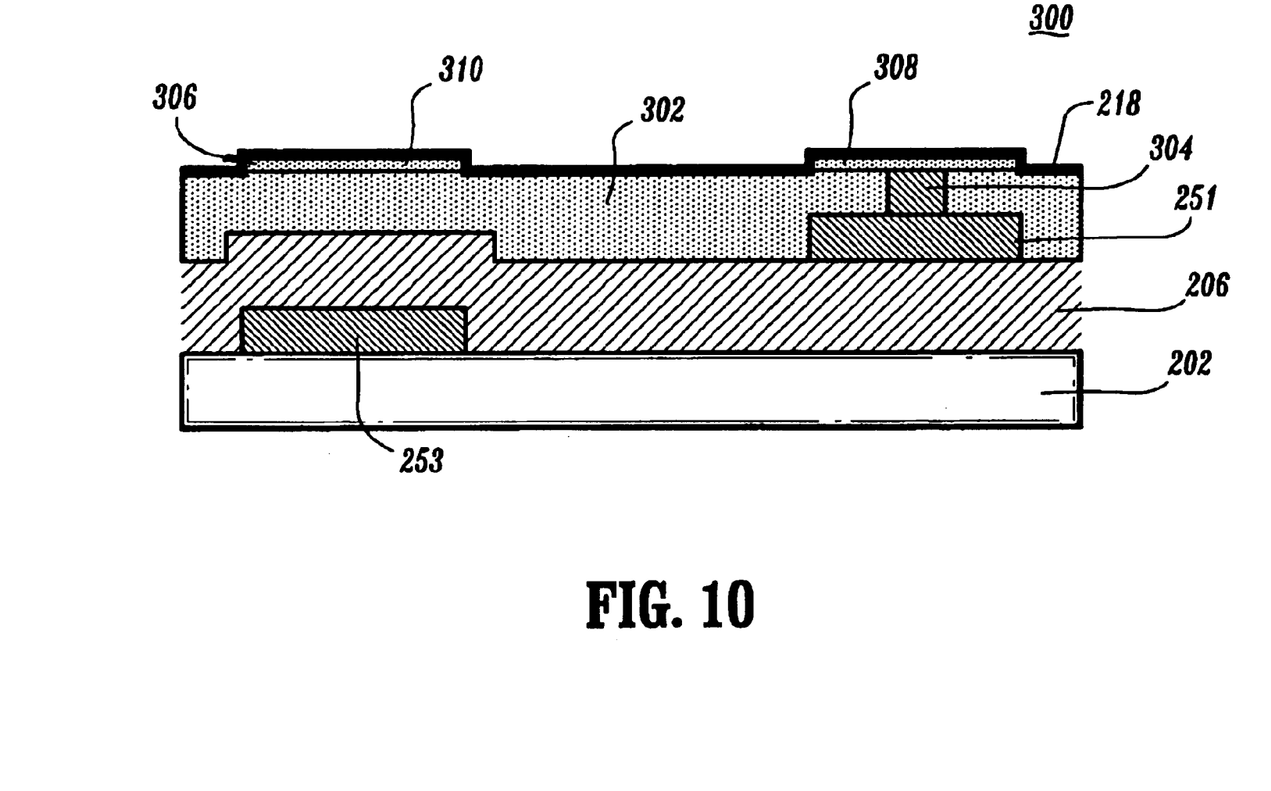
FIG. 10 is a cross-sectional view of the IPS mode display showing a common electrode and a pixel electrode formed on the same level and from the same material where the pixel electrode is connected to the data metal in accordance with the present invention.

Referring to FIG. 10, an illustrative structure 300 is shown which will eliminate both interface trapping and work function differences in accordance with another embodiment of the present invention. In structure 300, on top of dielectric layer 206 and TFTs in an array area (not shown), a polymer layer 302 is formed. Then, a via 304 is opened over a drain portion 251 of a thin film transistor, before a final conductive layer 306 deposition and patterning to form pixel electrodes 308 and common electrodes 310. Conductive layer 306 may include for example, ITO, IZO or transparent or opaque conductors (e.g., metals). Advantageously, electrodes 308 and 310 are formed at the same time on a same level for both common and pixel electrodes (310 and 308, respectively). Common electrode 310 is formed over data metal 253.

In one embodiment, the thickness of polymer layer 302 may be between about 2–5 microns. Polymer layer 302 may include, for example, polyimide. Since polymer layer 302 is a very good insulator and the same type of electrodes are formed on the same level without passivation on top of electrodes 308 and 310, the interface charge trapping and work function differences are simultaneously addressed.

An alignment layer 218 is formed over polymer layer 302 and electrodes 308 and 310. In addition to interface charge trapping, the image sticking can be caused by charge trapping in alignment layer 218. The charges trapped in alignment layer 218 have to be dissipated out to reduce the image sticking. The more charge is trapped and the longer charge is trapped by alignment layer 218, the worse image sticking results.

In one embodiment, to reduce the trapping effect, a slightly conducting alignment layer 218 is employed to shunt the charges out. Slightly conducting may include resistivities of greater than or equal to about $10^6$ Ω-cm, preferably between about $10^7$ Ω-cm to about $10^{10}$ Ω-cm. A DLC film is one example of a slightly conducting alignment layer. A DLC film has many dangling bonds acting as active trapping centers. It is possible to passivate the surface to reduce the density of these dangling bonds. However, it is not easy to completely passivate all of them. By removing the passivation layer over electrodes and making alignment layer 218 in direct contact with electrodes (210 and 212 in FIG. 9 or 308 and 310 in FIG. 10) or with conducting layers formed on the electrodes (e.g., layer 220 in FIG. 9 or layer 306 in FIG. 10), it is possible to shunt the charge trapped by the DLC film to the electrodes by utilizing the slight conductivity of the DLC films. Sufficient anchoring energy is needed for the alignment layer to eliminate the image sticking.

Figure 11:
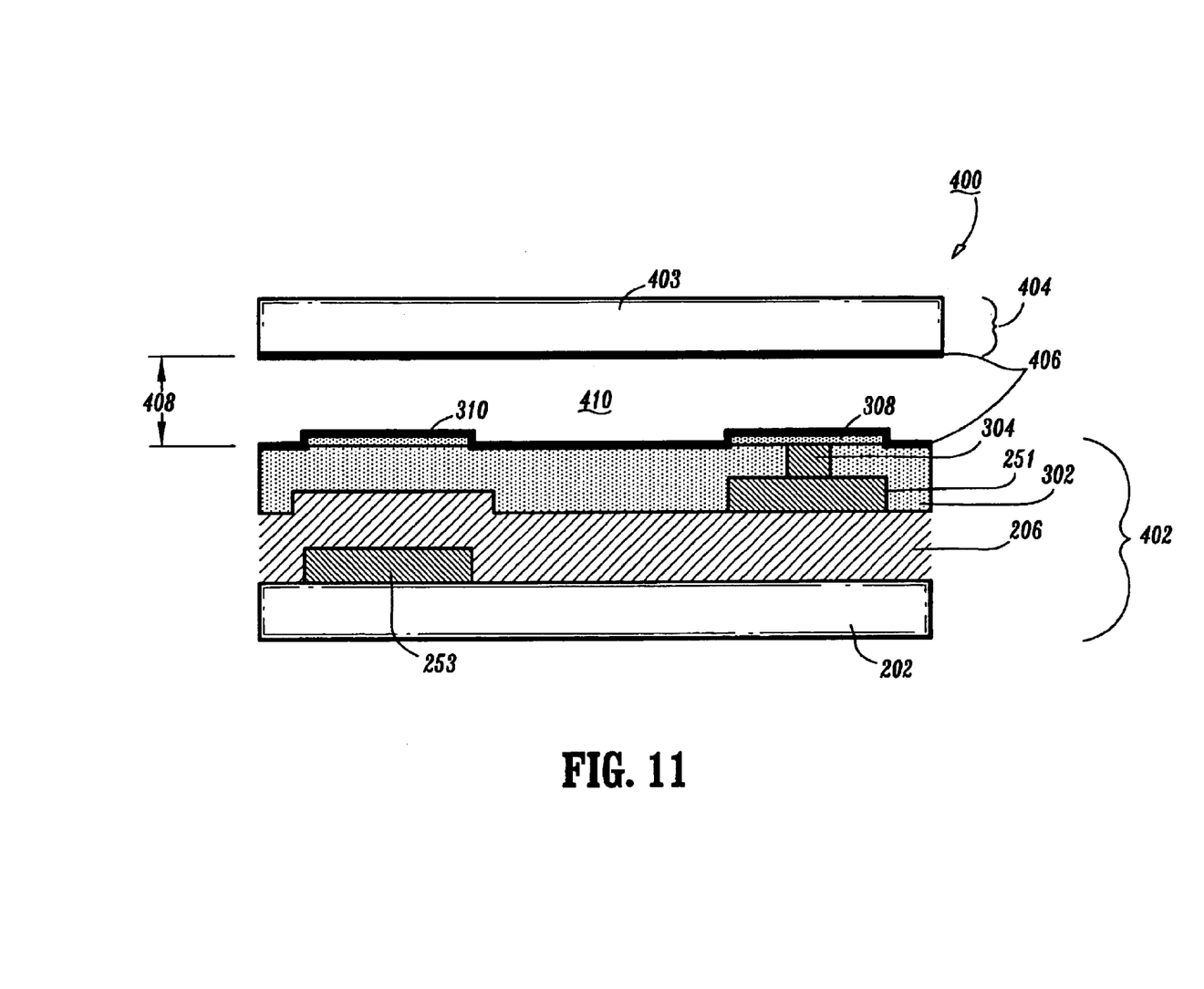
FIG. 11 is a cross-sectional view of an IPS mode display in accordance with one embodiment of the present invention.

It is to be understood that in a completed IPS mode display, alignment layer 218 will be in contact with liquid crystal material 14 as shown in FIG. 11.

Referring to FIG. 11, an IPS mode display 400 is shown in accordance with the present invention. A first display substrate 402 is illustratively shown with the structure of FIG. 10; however, the structures shown in FIGS. 8 or 9 may also be employed. A second display substrate 404 may include a glass layer 403 or a layer including other suitable transparent materials. An alignment layer 406 is formed on substrate 404. Alignment layer 406 may include DLC or a rubbed polymer layers. Alignment layer 406 FIG. 10 preferably includes the same materials as the alignment layer on substrate 402. Substrates 402 and 404 are spaced apart to form a gap 408 and sealed as is known in the art. Gap 408 is then filled with liquid crystal 410. Other arrangements and configurations may also be employed in accordance with the present invention.

Figure 12:
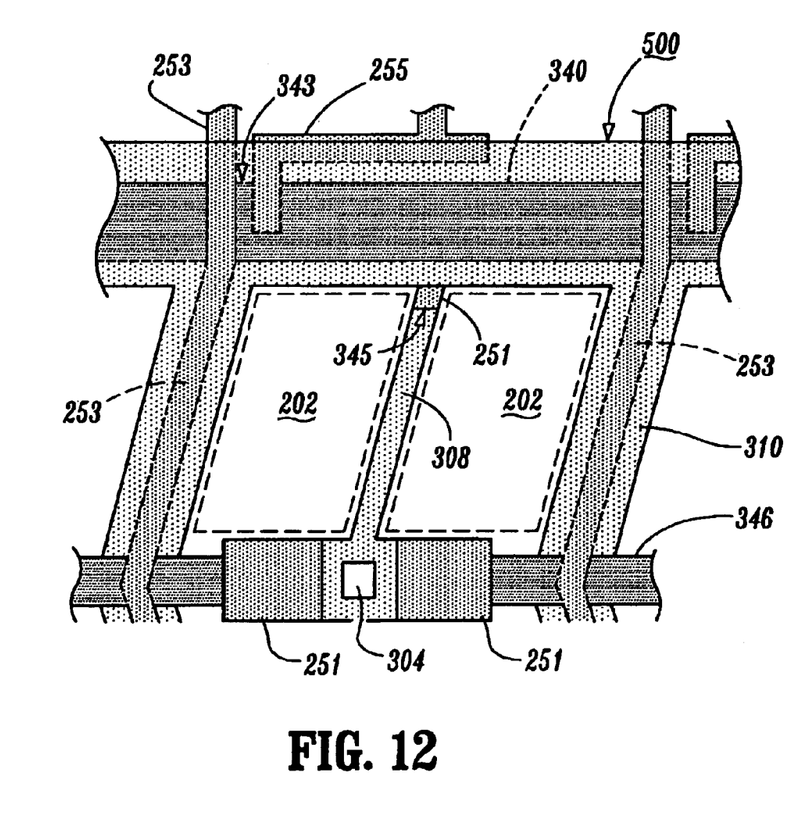
FIG. 12 is a top view of an illustrative display panel in accordance with the present invention.

Referring to FIG. 12, a top view of an illustrative display panel 500 is shown. Display panel 500 shows one layout design for a single substrate of an IPS mode display. It is to be understood that other layouts are also contemplated by the present invention. A glass substrate 202 includes a plurality of layers. Dielectric layers are transparent in FIG. 12 to show the wiring of display 500. A thin film transistor (TFT) 343 includes drain metal 253 and source metal 255 and a gate metal 340. TFT 343 is employed to apply voltage to pixel electrode 308 as is known in the art. A lower portion 251 of pixel electrode 308 includes data metal (same metal as data lines 253). Lower portion 251 is connected to pixel electrode 308 by via 304. Lower portion 251 runs below pixel electrode 308. A small break away portion 345 shows lower portion 251 by showing a part of pixel electrode 308 removed. A storage capacitor line 346 is also shown.

Having described preferred embodiments of high aperture and high resolution in-plane switching mode TFT-LCD (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A display panel for an in-plane switching mode display, comprising:
    a substrate;
    a first electrode formed on the substrate;
    a dielectric layer formed on the substrate, the dielectric layer forming an opening down to the first electrode such that the first electrode is in communication with the opening;
    a second electrode formed on the dielectric layer;
    an alignment layer formed on the first electrode, the second electrode and the dielectric layer.

2. The display panel as recited in claim 1, wherein the first electrode includes a same metal as the second electrode.

3. The display panel as recited in claim 1, wherein the first electrode and the second electrode each include a top layer formed from a same material, the alignment layer being formed on the top layer.

4. The display panel as recited in claim 3, wherein the top layer includes one of indium tin oxide, indium zinc oxide and a metal.

5. The display panel as recited in claim 1, wherein the alignment layer includes a slightly conductive material.

6. The display panel as recited in claim 1, wherein the alignment layer includes diamond-like-carbon.

7. The display panel as recited in claim 1, further comprising:
   a second substrate having a second alignment layer, the second substrate being spaced apart from the alignment layer formed on the first electrode, the second electrode and the dielectric layer by a gap; and
   liquid crystal disposed in the gap.

8. The display panel as recited in claim 1, further comprising:
   a second substrate having a second alignment layer, the second substrate being spaced apart from the alignment layer formed on the common electrode, the pixel electrode and the polymer layer by a gap; and
   liquid crystal disposed in the gap.

9. A display panel for an in-plane switching mode display, comprising:
   a substrate;
   a first electrode formed on the substrate;
   a dielectric layer formed on the substrate and on the first electrode;
   a second electrode formed on the dielectric layer;
   a polymer layer formed on the dielectric layer and on the second electrode;
   a common electrode formed over the first electrode on the polymer layer; and
   a pixel electrode formed over the second electrode on the polymer layer, the pixel electrode being connected to the second electrode; and
   an alignment layer formed on the common electrode, the pixel electrode and the polymer layer.

10. The display panel as recited in claim 9, wherein the pixel electrode includes a same material as the common electrode.

11. The display panel as recited in claim 10, wherein the same material includes one of indium tin oxide, indium zinc oxide and a metal.

12. The display panel as recited in claim 9, wherein the alignment layer includes a slightly conductive material.

13. The display panel as recited in claim 9, wherein the alignment layer includes diamond-like-carbon.

14. A method for forming a liquid crystal display panel, comprising the steps of:
   patterning a first metal to form a first electrode;
   depositing a dielectric layer over the substrate and the first electrode;
   removing the dielectric layer from the first electrode;
   forming a second electrode on the dielectric layer; and
   forming an alignment layer on the first and second electrodes and on the dielectric layer.

15. The method as recited in claim 14, wherein the first electrode includes a same material as the second electrode.

16. The method as recited in claim 14, further comprising the step of before the step of forming the alignment layer, depositing and patterning a top layer from a same material on each of the first electrode and the second electrode.

17. The method as recited in claim 16, wherein the top layer includes one of indium tin oxide, indium zinc oxide and a metal.

18. The method as recited in claim 14, wherein the alignment layer includes a conductive material.

19. The method as recited in claim 14, wherein the alignment layer includes diamond-like-carbon.

20. A method for forming a liquid crystal display panel, comprising the steps of:
   patterning a first metal to form a first electrode;
   depositing a dielectric layer over the substrate and the first electrode;
   patterning a second metal to form a second electrode on the dielectric layer;
   forming a polymer layer on the dielectric layer and the second electrode;
   forming a via through the polymer layer over the second electrode;
   forming a conductive layer on the polymer layer wherein a connection is made to the second electrode through the via;
   patterning a common electrode and a pixel electrode from the conductive layer such that the common electrode is formed over the first electrode and the pixel electrode is formed over and connected to the second electrode; and
   forming an alignment layer on the common electrode, the pixel electrode and on the polymer layer.

21. The method as recited in claim 20, wherein the conductive layer includes one of indium tin oxide, indium zinc oxide and a metal.

22. The method as recited in claim 20, wherein the alignment layer is slightly conductive.

23. The method as recited in claim 20, wherein the alignment layer includes diamond-like-carbon.

* * * * *